United States Patent
Fantinel et al.

(10) Patent No.: US 9,650,505 B2
(45) Date of Patent: *May 16, 2017

(54) POLYMER COMPOSITION FOR BUMPERS AND INTERIORS AND POLYETHYLENE-BASED RESIN PRECURSOR

(71) Applicant: Basell Poliolefine Italia S.r.l., Milan (IT)

(72) Inventors: Fabiana Fantinel, Ferrara (IT); Sander Willems, Ferrara (IT); Michele Grazzi, Ferrara (IT); Giampaolo Pellegatti, Ferrara (IT); Jurgen Rohrmann, Kelkheim (DE); Shahram Mihan, Bad Soden (DE)

(73) Assignee: Basell Poliolefine Italia S.r.l., Milan (IT)

(*) Notice: Subject to any disclaimer, the term of this patent is extended or adjusted under 35 U.S.C. 154(b) by 247 days.

This patent is subject to a terminal disclaimer.

(21) Appl. No.: 14/357,503

(22) PCT Filed: Oct. 30, 2012

(86) PCT No.: PCT/EP2012/071444
§ 371 (c)(1),
(2) Date: May 9, 2014

(87) PCT Pub. No.: WO2013/068274
PCT Pub. Date: May 16, 2013

(65) Prior Publication Data
US 2014/0316048 A1    Oct. 23, 2014

Related U.S. Application Data

(60) Provisional application No. 61/559,474, filed on Nov. 14, 2011.

(30) Foreign Application Priority Data

Nov. 11, 2011 (EP) .................................... 11188851

(51) Int. Cl.
*C08L 23/06* (2006.01)
*C08L 23/08* (2006.01)
*C08L 23/10* (2006.01)
*C08L 23/12* (2006.01)

(52) U.S. Cl.
CPC ............... *C08L 23/12* (2013.01); *C08L 23/06* (2013.01); *C08L 23/10* (2013.01); *C08L 23/0807* (2013.01)

(58) Field of Classification Search
CPC .................................................... C08L 23/0807
See application file for complete search history.

(56) References Cited

U.S. PATENT DOCUMENTS

| | | |
|---|---|---|
| 8,735,513 B2 | 5/2014 | Nakashima et al. |
| 2004/0092631 A1 | 5/2004 | Joseph |
| 2010/0256281 A1 | 10/2010 | Palama |

FOREIGN PATENT DOCUMENTS

| | | | |
|---|---|---|---|
| EP | 1238796 A2 | | 9/2002 |
| EP | WO 2004/087807 | * | 10/2004 |
| EP | WO 2010081753 | * | 7/2010 |
| EP | WO 2010/115878 | * | 10/2010 |
| WO | WO2006/024579 A1 | | 3/2006 |
| WO | WO2008/077530 A2 | | 7/2008 |
| WO | WO2010/081676 A1 | | 7/2010 |
| WO | WO2010/115878 A1 | | 10/2010 |
| WO | WO-2011055802 A1 | | 5/2011 |

OTHER PUBLICATIONS

PCT International Search Report & Written Opinion mailed Jan. 17, 2013, for PCT/EP2012/071444.

* cited by examiner

*Primary Examiner* — Melissa Rioja

(57) ABSTRACT

Polyolefin compositions suitable for injection molded items e.g. for impact bumpers and car interiors comprising from 30% to 90% by weight of an heterophasic propylene polymer composition (A); and from 10% to 70% by weight of a multimodal ethylene/butene-1 copolymer (B); having density from 0.850 to 0.935 g/cm$^3$, total comonomer content from 6% to 30% by weight, Mw/Mn from 4 to 20; intrinsic viscosity in decalin at 135° C. from 1.0 to 4.0 dL/g, and comprising an HDPE fraction (HDPE % wt) up to 30% wt; further comprising from 0 to 50% by weight of a filler (C) and optionally, in amount up to 10% by weight with respect to the overall composition, an impact modifier masterbatch component D consisting of an ultra-soft heterophasic copolymer component.

4 Claims, No Drawings

POLYMER COMPOSITION FOR BUMPERS AND INTERIORS AND POLYETHYLENE-BASED RESIN PRECURSOR

This application is the U.S. National Phase of PCT International Application PCT/EP2012/071444, filed Oct. 30, 2012, claiming priority of European Patent Application No. 11188851.7, filed Nov. 11, 2011, and the benefit under 35 U.S.C. 119(e) of U.S. Provisional Application No. 61/559,474 filed Nov. 14, 2011, the contents of which are incorporated herein by reference in their entirety.

FIELD OF THE INVENTION

The present invention relates to a composition comprising a polypropylene-based resin and a polyethylene-based resin, said composition having an excellent balance of properties, particularly high stiffness and good impact strength that renders it useful for applications in automotive field, in particular as bumpers exterior and interior trims, luggage and house wares. The polyethylene-based resin precursor is obtainable via a gas phase process. The invention further relates to the process features necessary to ensure improved operability for the obtainment in the gas phase of the polyethylene-based resin precursor of the polymer composition of the invention.

BACKGROUND OF THE INVENTION

As it is known, the isotactic polypropylene, though being endowed with an exceptional combination of excellent properties, is affected by the drawback of possessing an insufficient impact resistance at relatively low temperatures specially below its glass transition temperature (Tg).

According to the teaching of the prior art, it is possible to obviate the said drawback without sensibly affecting the other polymer properties, by properly adding rubbers and polyethylene to the polypropylene.

For example, the U.S. Pat. No. 4,245,062 discloses a process for producing a blend of polypropylene and two different propylene-ethylene copolymers, one of said copolymers substantially forming the rubbery phase. The propylene polymers thus obtained have good impact resistance at low temperature.

In U.S. Pat. No. 4,521,566 a polypropylene composition is disclosed having the following composition:

74 to 91% of crystalline isotactic polypropylene, 6.7 to 19% of an amorphous copolymeric fraction of ethylene and propylene and 1.5 to 8.5% of crystalline polyethylene containing from 50 to 98 of ethylene and exhibiting a crystalline of polyethylene type.

The U.S. Pat. No. 4,473,687 discloses polypropylene moulding compositions of polypropylene, ethylene-propylene copolymer and polyethylene in different proportions, said composition having high hardness and increased impact strength.

In U.S. Pat. No. 4,734,459 a polypropylene composition having good whitening resistance is disclosed. According to the teaching of the said prior art document, it is possible to improve whitening resistance by replacing the ethylene-propylene copolymer rubber with an ethylene-butene-1 copolymer rubber.

In the European patent application EP-A-1 236 769 (Borealis) an heterophasic propylene composition is disclosed with improved balance of impact stiffness and stress whitening resistance comprising a crystalline propylene polymer matrix (i) an elastomeric component (ii) and an ethylene copolymer plastomer. (iii). The elastomeric component (ii) is a propylene/ethylene copolymer (C3/C2) and the ethylene copolymer plastomer (iii) is a metallocene catalyst derived plastomer (Exact C2C4 and C2C8), in the examples.

The international patent application WO2006/067023 A1 discloses polyolefin compositions obtained by sequential polymerization having:

50-77% of a crystalline propylene polymer having high isotacticity;

13-28% of an elastomeric copolymer of ethylene and propylene, partially soluble in xylene at room temperature (25° C.); and 10-22% of polyethylene having an intrinsic viscosity value ranging from 1 to 3 dl/g and optionally containing recurring units deriving from propylene (copolymerized propylene) in amounts up to lower than 10% (HDPE).

The international patent application WO2010/081753 A1 discloses polyolefin compositions comprising from 30% to 90% by weight of a propylene polymer composition (A) comprising a crystalline propylene homopolymer, or a copolymer of propylene containing 3% or less of derived units of ethylene or $C_4$-$C_{10}$ α-olefin(s) or of combinations thereof, and an elastomeric copolymer of ethylene containing from 40% to 70% by weight, of units derived from propylene or $C_4$-$C_{10}$ α-olefin(s) or of combinations thereof; and B) from 10% to 70% by weight of a multimodal ethylene copolymer with alpha olefins as comonomer of formula $CH_2=CHT$ wherein T is a $C_3$-$C_{10}$ alkyl group, having density (with ISO 1183) comprised in the range from 0.850 to 0.935 g/cm$^3$.

SUMMARY OF THE INVENTION

It has now surprisingly been found that it is possible to obtain polypropylene compositions endowed with improved balance of properties with particularly high stiffness and good impact resistance by using a selection of multimodal ethylene copolymer resins having particular features and being produced by a particular catalyst systems and process.

Thus, an embodiment of the present invention consists of a polymer composition comprising:

A) from 30% to 90% by weight of a propylene polymer composition comprising (all percentages by weight):

a1) from 20% to 90% of a propylene homopolymer, or a copolymer of propylene or blends thereof containing 8% or less, preferably 3% or less of copolymerized ethylene and/or $C_4$-$C_{10}$ α-olefin(s), said homopolymer or copolymer or blends having an isotactic index greater than 80% and preferably a content of isotactic pentads (mmmm), measured by $^{13}C$ NMR on the fraction insoluble in xylene at 25° C., higher than 96%;

a2) from 10% to 80%, of a copolymer of ethylene or a blend of copolymers of ethylene containing from 40% to 70% of copolymerized propylene or $C_4$-$C_{10}$ α-olefin(s) or of combinations thereof.

said composition A having intrinsic viscosity of the xylene soluble fraction at room temperature of from 1.5 to 8, preferably from 1.5 to 3.5 dl/g;

B) from 10% to 70% by weight of a multimodal ethylene copolymer with butene-1 as comonomer; having the following properties:
i) density comprised in the range from 0.850 to 0.935 preferably of from 0.880 to 0.920, even more preferably from 0.895 to 0.912 g/cm$^3$ as measured according to ISO1183-1::2004;
ii) itotal butene-1 comonomer content ranging from 6% to 30% by weight, preferably of from 10 to 20% by weight;
iii) Mw/Mn comprised from 4 to 20, preferably from 4 to 10;
iv) intrinsic viscosity (decalin at 135° C. as determined according to EN ISO 1628-312003) comprised between 1.0 and 4.0 dL/g, preferably from 1 to 2.5, more preferably from 1.5 to 2.5 dL/g,
v) preferably having a FRR ratio of MFR measured at 190°/21 Kg (according to ISO 1133::2005) to MFR measured at 190°/2.16 Kg (according to ISO 1133::2005) of equal to or less than 30 gr/10 min, preferably less than 25 gr/10 min
C) from 0 to 50% by weight of a filler.

The multimodal ethylene copolymer component B) according to the invention is comprising an HDPE fraction (HDPE % wt), preferably a homopolymer fraction, determined via TREF analysis (Temperature rising elution fractionation) of up to 30% wt, preferably of from 3-30% wt, more preferably of from 15 to 25.

Further optionally and advantageously the composition of the invention is comprising also a component
D) in amount up to 10%, preferably from 2-10%, more preferably from 5-10%, by weight, with respect to the overall composition, of an impact modifier masterbatch consisting of an heterophasic copolymer component comprising (all percentages by weight):
a) 10-45% of a homopolymer or a copolymer of propylene;
b) 10-30% of a copolymer of propylene with ethylene, containing from 18 to 45% of ethylene;
c) 35-60% of a copolymer of propylene with ethylene, containing from 55 to 85% of ethylene;
said component (D) having a MFR L measured at 230° C./2.16 Kg (according to ISO 1133::2005) of from 0.01 to 10 g/10 min, a value of the intrinsic viscosity of the fraction soluble in xylene at room temperature (I.V.sol) of from 1.5 to 3 dl/g, preferably from 2 to 3 dl/g and a value of the ratio I.V.sol/MFR L equal to or lower than 6, preferably equal to or lower than 4.

With the composition of the present invention it is possible to achieve materials having improved balance of properties, high stiffness and good impact strength and particularly improved biaxial impact measured at low temperatures (−20° C. and −30° C.).

DETAILED DESCRIPTION OF THE INVENTION

The composition according to the present invention further exhibits lower gloss on plaque and lower or comparable C-emission with respect to commercial formulations of reference. Preferred for injection molding items for impact application (bumpers) are the compositions according to the invention having a dual rubber as component (a2) comprising two amorphous fractions xylene soluble at 25° C. having intrinsic viscosities $XSIV_1$ and $XSIV_2$ differing by at least 1 unit. Particularly preferred is a dual rubber component (a2) having $XSIV_1$ of from 2.9-3.3 and $XSIV_2$ of from 6.5 to 7.5 dl/g. Improved low temperatures impact properties and tensile properties (elongation at break) are typically exhibited by the said preferred compositions according to the invention particularly when component (B) is above 20% preferably above 30% by weight of the overall composition without impairing other physical-mechanical properties.

Particularly preferred features of the propylene polymer composition A) are:
a molecular weight distribution in component (a1), expressed by the Mw/Mn ratio, measured by GPC, equal to or higher than 5, in particular from 7 to 20;
Flexural Modulus from 700 to 2000 MPa, more preferably from 800 to 1700 MPa;
Melt Flow Rate (MFR) from 0.5 to 45 g/10 min, more preferably from 2 to 35 g/10 min; even more preferably from 6 to 20 g/10 min (measured according to ISO 1133::2005, at 230° C., 2.16 kg load);
XS at room temperature (25° C.) of from 10 to 40%

The propylene polymer composition A) can be prepared, according to known processes such as described in WO 2004/087807, EP-A-472946 and in WO03/011962 here fully incorporated by reference, in the presence of a highly stereospecific Ziegler-Natta catalyst. In particular, the catalyst system used typically comprises (i) a solid catalytic component containing a titanium compound and an electron-donor compound, both supported on magnesium chloride, and (ii) an Al trialkyl compound and optionally an electron-donor compound. Other catalysts that may be used are metallocene-type catalysts, as described in U.S. Pat. No. 5,324,800 and EP-A-0 129 368; particularly advantageous are bridged bis-indenyl metallocenes, for instance as described in U.S. Pat. No. 5,145,819 and EP-A-0 485 823. These metallocene catalysts may be used in particular to produce the component (a2).

Substantially the process for preparing the said composition A) can be a sequential polymerization comprising at least two sequential steps, wherein components (a1) and (a2) are prepared in separate subsequent steps, operating in each step, except the first step, in the presence of the polymer formed and the catalyst used in the preceding step. The catalyst is added only in the first step, however its activity is such that it is still active for all the subsequent steps. The polymerization can occur in liquid phase, gas phase or liquid-gas phase. Examples of suitable reactors are continuously operated stirred reactors, loop reactors, fluidized-bed reactors or horizontally or vertically stirred powder bed reactors. Of course, the reaction can also be carried out in a plurality of reactors connected in series. It is possible to carry out the polymerization in a cascade of stirred gas-phase reactors which are connected in series and in which the pulverulent reaction bed is kept in motion by means of a vertical stirrer. Reaction time, pressure and temperature relative to the polymerization steps are not critical, however it is best if the temperature is from 20 to 150 C, in particular from 50 to 100 C. The pressure can be atmospheric or higher. The regulation of the molecular weight is carried out by using known regulators, hydrogen in particular. The compositions can also be produced by a gas-phase polymerization process carried out in at least two interconnected polymerization zones. The said type of process is illustrated in European patent application 782 587 here fully incorporated by reference. Alternatively the propylene polymer composition A) can be obtained by blending in the molten state, that is to say at temperatures greater than their softening or melting point, in appropriate amount amounts crystalline polymer components (type a1) and amorphous rubbery polymer components (type a2), previously prepared in separate polymerization processes.

The multimodal ethylene copolymer component B) shows a multimodal comonomer distribution, preferably at least bimodal distribution at TREF analysis. This means that the component (B) is a Very Low density Linear Polyethylene (VLLDPE) comprising at least a low Mw (HDPE) component and a higher MW plastomeric component that can be detected and separated via TREF.

TREF analyzes comonomer distribution based on short side chain branching frequency essentially independent of molecular weight, based on the differential melting behaviour of the different phases in the semicrystalline polymer, the fractions having a lower % crystallinity eluting earlier (for method guidance, cp. detailed description in Wild, L., Temperature rising elution fractionation, Adv. Polymer Sci. 98: 1-47, (1990), for any issues not addressed in Wild, L., further refer to TREF description in U.S. Pat. No. 5,008,204 incorporated herewith by reference). For preparative TREF aiming to resolve the polyethylene composition of the present invention into two distinct fractions, a high molecular weight plastomer and a high density fraction which are subsequently subjected to measurement of intrinsic viscosity, a particular protocol was applied:

The following approach was applied in order to obtain a preparative separation between the plastomeric fraction and the HDPE component. An amount of sample between 1 and 2 g was dissolved in 180 mL of o-xylene at 137° C., under stirring condition for about 1 h. This solution was then loaded in a steel column packed with an inert support and heated at the same temperature of the sample solution.

The crystallization of the polymer was carried out by cooling down linearly in 10 h from 137 to 77° C. The elution of the polymer was step-wise: at 77, 100 and 137° C. with o-xylene. Two sample fractions (77 and 100° C.) were recovered by precipitation with acetone and they were subsequently investigated with other analytical techniques. At 137° C. no polymer was found. The first fractions turned out to be made of the plastomeric material, whereas the HDPE was found in the second one. HDPE % was calculated from the above fraction amount so determined.

Preferably, according to the present invention, also the intrinsic viscosity of the Mc or plastomer part of the total polyethylene composition is at least 1.2 dL/g or above, preferably is of from 1.6 to 2.5 dL/g. Further preferred, in combination therewith, the dimensionless ratio of the intrinsic viscosities of the plastomer fraction divided by the high density fraction is >1.5, preferably is of from 2 to 4. More preferably, alone or in combination therewith, the intrinsic viscosity of the high density fraction is <1.5 dL/g, preferably is of from 0.5 to 0.9 dL/g.

Alternatively, with substantially equivalent results, the HDPE % in the bimodal composition can be also determined by DSC. Particularly two peaks in DSC are observed in second run (Tm2): a first at high temperature peak (Tm2 I), of from 126.5 to 130° C. assigned to the HDPE component, and a second peak at lower temperature (Tm2 II) of from 50 to 100° C. The second lower temperature peak is assigned to the metallocene (Mc) higher molecular weight plastomeric component mass fraction of the polymer. HDPE % is calculated from the above DSC thermogram as described in PCT/EP2011/002613

Also, alternatively the same or substantially comparable measure of the HDPE % (HDF %) in the multimodal polyethylene component (B) can be obtained via the Crystaf analysis eventually also combined with solvent-non-solvent extraction/fractionation method of Holtrup (W. Holtrup, Makromol. Chem. 178, 2335 (1977)), as described and used in WO 2010/081676.

The density for the polymer fraction corresponding to the high MW plastomeric component, is of from 0.870 to 0.905 g/cm$^3$, preferably of from 0.880 to 0.900 g/cm$^3$, based on %-crystallinity calculated based on the melting enthalpy DSC ($\Delta H_{2,\ HD}$—calculated from the DSC thermogram as described in the international application n. PCT/EP2011/002613) or equivalently starting from HDPE % determined via TREF or Crystaf.

The multimodal ethylene copolymer component B) can be prepared according to the international application WO 2010/081676 using butene-1 as comonomer feed and particularly also according to PCT/EP2011/002613 herewith incorporated by reference. The said multimodal ethylene is prepared with suitable catalysts and catalyst systems respectively, co-catalyst additivation and preferred co-catalysts, suitable support materials and supportation methods as well suitable polymerisation methods have all been set forward in detail in WO 2010/034520 A1, incorporated herewith in full by reference.

Notably, use of antistatics is not a mandatory prerequisite for the present process, different from polymerization of higher density products. The absence of an antistatic is a further preferred embodiment of the present invention, the antistatics having disadvantages as well. Gas phase polymerization, and in particular fluidised bed reactors, are well known to the skilled person. A suitable example and preferred mode of operation of a fluidised gas phase reactor is described in US 2010/0160580, incorporated herewith fully by reference except for the catalysts used therein but including the references suitably cited in said document with regard to detail aspects of instrumentation/engineering and reactor operation. Further generic disclosure of gas phase polymerization processes can be found in WO 01/77191, for instance, incorporated herewith.

Further preferably, the polyethylene composition has been produced in the presence of a mixed catalyst system comprising at least one metallocene, preferably comprising at least one zirconocene. More preferably, the polyethylene has been produced in the presence of at least one metallocene A) and at least one further non-metallocene, non-Ziegler, metallorganic transition metal complex catalyst B)

Preferably, the composition has a Comonomer distribution index or CDBI of <65%. The CDBI is well known to the skilled person. CDBI (composition distribution breadth index) is a measure of the breadth of the distribution of copolymer composition, with regard to the level of comonomer incorporated into polymer, the latter reducing crystallinity of domains made from such polymer chains by means of short side chain branching as compared to crystalline homopolymer. This is described, for example, in WO 93/03093. The CDBI is defined as the percent by weight or mass fraction of the the copolymer molecules having a comonomer contents of ±25% of the mean total molar comonomer content, i.e. the share of comonomer molecules whose comonomer content is within 50% of the average comonomer content. CDBI is determined by TREF (temperature rising elution fraction) analysis (Wild et al. J. Poly. Sci., Poly. Phys. Ed. Vol. 20, (1982), 441 or U.S. Pat. No. 5,008,204).

Preferably, the afore said polyethylene composition of the present invention has a shear flow rate or melt index MFR (2.16 kg/190° C.) of from 0.2 to 5 g/10 min. as measured according to ISO 1133::2005, more preferably of from 1 to 4 g/10 min. In combination therewith, the dimensionless flow rate ratio, FRR equal to the MFR measured at 190°/21 Kg (according to ISO 1133::2005) to the MFR measured at 190°/2.16 Kg (according to ISO 1133::2005) is preferably of from 18 to 30, more preferably of from 18 to 25.

The bimodal ethylene product component (B) is preferably obtained in a gas phase reactor process, preferably a fluidized bed gas phase reactor, wherein the inert gas medium is a pressurized gas mixture of propane or ethane further comprising 50% vol or more of nitrogen preferably 55-95% vol of nitrogen in the inert medium. The said inert gas mixture is particularly preferred to reduce stickiness of the material leading to agglomeration and fluidization problems in the gas phase process. The amount of further hydrocarbons ($C_4$-$C_{10}$) if present however should be kept <0.5 (v/v).

When producing VLLDPE (component B in the present invention), particularly having low density equal to or lower than 0.910 g/cm$^3$, obtainable by reducing the amount of HDPE % in the polymer and/or increasing the comonomer amount, it is known that packing and sheeting can occur in a gas phase reactor operated in continuous. This was observed both in the operating conditions of the international application WO2010/081753 using propane as an inert gas, and also operating like in the international application PCT/EP2011/002613 with pressurized nitrogen as the inert gas. The problem is particularly hampering operations when scaling up from small-medium scale operations (1-5 Kg/h output) to large scale operations up to 10 Kg/h or above.

It was surprisingly found that the use of an inert mix of nitrogen and propane or of nitrogen and ethane is solving the problem, providing smoother operations even in a large scale plant, without packing also when producing VLLDPE at the very low densities. The examples of component B) according to the invention, were produced operating in continuous (e.g. at least for three days or more) without packing, at more than 10 Kg/h of output.

The optional heterophasic copolymer component D) can be prepared according to known processes such as described in the international patent application WO2010/112337.

The composition of the present invention may further comprise of from 0 to 30% by weight, preferably 0.1 to 10 by weight of auxiliaries and/or additives known per se, e.g. processing stabilizers, stabilizers against the effects of light and heat, customary additives such as lubricants, antioxidants, antiblocking agents and antistatics, and also, if appropriate, dyes.

In particular, the addition of nucleating agents brings about a considerable improvement in important physical-mechanical properties, such as Flexural Modulus, Heat Distortion Temperature (HDT), tensile strength at yield and transparency.

Typical examples of nucleating agents are the p-tert.-butyl benzoate and the 1,3- and 2,4-dibenzylidenesorbitols.

The nucleating agents are preferably added to the compositions of the present invention in quantities ranging from 0.05 to 2% by weight, more preferably from 0.1 to 1% by weight with respect to the total weight.

The addition of inorganic fillers (component C), such as talc, calcium carbonate and mineral fibers, also brings about an improvement to some mechanical properties, such as Flexural Modulus and HDT. Talc can also have a nucleating effect.

The composition according to the present invention is particularly useful in producing moulded and/or extruded articles by employing of conventional injection moulding, blow moulding and/or extrusion techniques. Preferably, these articles are body parts for automotive applications, either exterior or interior parts. The exterior parts may be bumper covers, exterior fascia, air dams, and other trim, the interior parts dash boards, air bag covers and the like.

The following examples are given for illustrative purposes and do not intend to limit the scope of the invention. All the above preferred embodiments and features are disclosed alone or in any combination with just some or all of the afore and below mentioned embodiments.

EXAMPLES

Experimental Part

Comonomer Content

Comonomer content has been measured via IR were not differently specified $^{13}$C NMR Comonomer Content Determination in the VLLDPE Component B)

$^{13}$C NMR spectra were acquired on a Bruker AV-600 spectrometer, operating at 160.91 MHz in the Fourier transform mode at 120° C.

The samples were dissolved in 1,1,2,2-tetrachloroethane-d2 at 120° C. with a 8% wt/v concentration. Each spectrum was acquired with a 90° pulse, 15 seconds of delay between pulses and CPD to remove $^1$H-$^{13}$C coupling. About 1500 transients were stored in 32K data points using a spectral window of 9000 Hz.

The peak of the $T_{\delta\delta}$ carbon (nomenclature according to C. J. Carman, R. A. Harrington and C. E. Wilkes, *Macromolecules*, 10, 536-544 (1977) was used as internal reference at 29.9 ppm.

The assignments of the spectra were made according to E. T. Hsieh, J. C. Randall, *Macromolecules*, 15, 353-360 (1982); E. T. Hsieh, J. C. Randall, *Macromolecules*, 15, 1402-1406 (1982); J. C. Randal, Macromol. Chem Phys., C29, 201 (1989); M. Kakugo, Y. Naito, K. Mizunuma and T. Miyatake, *Macromolecules*, 15, 1150-1152 (1982).

The evaluation of triad distribution and of the composition was made starting from relations between peaks and triads described in ref 5, modified to consider overlaps of signals in the spectra.

C2C4

$$BBB = 100 T_{\beta\beta}/S$$

$$BBE = 100 T_{\beta\delta}/S$$

$$EBE = 100 \ 2B_2(EBE)/S$$

$$BEB = 100 S_{\beta\beta}/S$$

$$BEE = 100 S_{\alpha\delta}/S$$

$$EEE = 100(0.25 S_{\gamma\delta} + 0.5 S_{\delta\delta})/S$$

C2C6 (comparative)

$$HHH = 100 T_{\beta\beta}/S$$

$$HHE = 100 T_{\beta\delta}/S$$

$$EHE = 100 T_{\delta\delta}/S$$

$$HEH = 100 S_{\beta\beta}/S$$

$$HEE = 100 S_{\beta\delta}/S$$

$$EEE = 100(0.25 S_{\gamma\delta} + 0.5 S_{\delta\delta})/S$$

High Density Polyethylene (HDPE) Content in the VLLDPE Component B)

The HDPE content (HDPE %) has been measured by subjecting each VLLDPE samples to the TREF analysis as above described. The TREF analysis were carried out under the following conditions: solvent 1,2,4-trichloro-benzene, flow: 1 ml/min, heating rate: 1° C./min, amount of polymer 5-10 mg, support: silica gel.

Thermal Property of the VLLDPE Component B); Determination Via DSC

The determination of temperature ($2^{nd}$ heat of melting, Tm2) and enthalpy of melting and crystallization was carried out by differential scanning calorimetry (DSC) using a method described in ISO 11357-3:1999(E) on a DSC Q2000 (TA Instruments, Helfmann-Park 10, 65760 Eschborn) with a heating and cooling rate of 20 K/min and indium for calibration. Data processing and calculation was carried out using TA Universal Analysis 2000 (TA Instruments, Helfmann-Park 10, 65760 Eschborn). The sample holder, an aluminum pan, is loaded with 5 to 6 mg of the specimen and sealed. The sample is then heated from ambient temperature to 200° C. with a heating rate of 20 K/min (first heating). After a holding time of 5 minutes at 200° C., which allows complete melting of the crystallites, the sample is cooled to −10° C. with a cooling rate of 20 K/min and held there for 2 minutes. Finally the sample is heated from −10° C. to 200° C. with a heating rate of 20 K/min (second heating). After construction of a baseline the area under the peak of the second heating run is measured and the enthalpy of fusion (ΔHf) in J/g is calculated according to said ISO 11357-3 (1999).

Particularly for the composition of the invention two peaks in DSC will be observed in second run (Tm2): a first at high temperature peak (Tm2 I), of from 125 to 130° C. assigned to the HDPE component, and a second peak at lower temperature (Tm2 II, flat broad peak) of from 50 to 100° C. The second lower temperature peak is assigned to the metallocene (Mc) high MW plastomeric component mass fraction of the polymer.

ΔHf reported as DSC ΔH2 [J/g] in the table 3 has been determined with integration of the DSC thermogram calculating the total area under the curve from 0° C. to 130° C.

Density

The density [g/cm$^3$] was determined in accordance with ISO 1183.

The Melt Flow Rate MFR and Flow Rate Ratio (FRR) was determined in accordance with ISO 1133 were not differently specified.

Xylene Soluble and Insoluble Fractions 2.5 g of polymer and 250 cm$^3$ of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 cm$^3$ of the filtered liquid is poured in a previously weighed aluminum container which is heated on a heating plate under nitrogen flow, to remove the solvent by evaporation. The container is then kept in an oven at 80° C. under vacuum until constant weight is obtained. The weight percentage of polymer soluble in xylene at room temperature is then calculated.

The percent by weight of polymer insoluble in xylene at room temperature is considered the isotacticity index of the polymer. This value corresponds substantially to the isotacticity index determined by extraction with boiling n-heptane, which by definition constitutes the isotacticity index of polypropylene.

Intrinsic Viscosity: determined in tetrahydronaphthalene at 135° C. (ASTM D 2857), where not differently specified.

The Molar Mass Distribution Width (MWD) or Polydispersity is Defined as Mw/Mn.

Definition of Mw, Mn, Mz, MWD can be found in the 'Handbook of PE', ed. A. Peacock, p. 7-10, Marcel Dekker Inc., New York/Basel 2000. The determination of the molar mass distributions and the means Mn, Mw and Mw/Mn derived therefrom was carried out by high-temperature gel permeation chromatography using a method described in DIN 55672-1:1995-02 issue February 1995. The deviations according to the mentioned DIN standard are as follows: Solvent 1,2,4-trichlorobenzene (TCB), temperature of apparatus and solutions 135° C. and as concentration detector a PolymerChar (Valencia, Paterna 46980, Spain) IR-4 infrared detector, capable for use with TCB.

A WATERS Alliance 2000 equipped with the following precolumn SHODEX UT-G and separation columns SHODEX UT 806 M (3×) and SHODEX UT 807 connected in series was used. The solvent was vacuum distilled under Nitrogen and was stabilized with 0.025% by weight of 2,6-di-tert-butyl-4-methylphenol. The flowrate used was 1 ml/min, the injection was 500 µl and polymer concentration was in the range of 0.01%<conc.<0.05% w/w. The molecular weight calibration was established by using monodisperse polystyrene (PS) standards from Polymer Laboratories (now Varian, Inc., Essex Road, Church Stretton, Shropshire, SY6 6AX,UK) in the range from 580 g/mol up to 11600000 g/mol and additionally Hexadecane. The calibration curve was then adapted to Polyethylene (PE) by means of the Universal Calibration method (Benoit H., Rempp P. and Grubisic Z., in J. Polymer Sci., Phys. Ed., 5, 753(1967)). The Mark-Houwing parameters used herefore were for PS: kPS=0.000121 dl/g, αPS=0.706 and for PE kPE=0.000406 dl/g, αPE=0.725, valid in TCB at 135° C. Data recording, calibration and calculation was carried out using NTGPC_Control_V6.02.03 and NTGPC_V6.4.24 (HS—Entwicklungsgesellschaft für wissenschaftliche Hard-und Software mbH, Hauptstraße 36, D-55437 Ober-Hilbersheim) respectively. Further with relevance to smooth, convenient extrusion processing at low pressure, preferably the amount of the polyethylene of the invention with a molar mass of <1 Mio. g/mol, as determined by GPC for standard determination of the molecular weight distribution, is preferably above 95.5% by weight. This is determined in the usual course of the molar mass distribution measurement by applying the WIN-GPC' software of the company 'HS-Entwicklungsgesellschaft für wissenschaftliche Hard-und Software mbH', Ober-Hilbersheim/Germany, see supra.

Applying the universal calibration method based on the Mark-Houwink constants given above may additionally be nicely and comprehensibly inferred in detail from ASTM-6474-99, along with further explanation on using an additional internal standard-PE for spiking a given sample during chromatography runs, after calibration.

C-Emission (Headspace)

European Automotive Industry standard VDA-277 1995 for C-emission analysis by Headspace GC.

Biaxial Impact Test Method:

Injection molded test specimens were die-punched with a circular 38 (±0.2 mm) diameter punch from a 1.5×127×127 mm plaque Injection molding conditions for the specimen preparation were set as follow:

Melt temperature at 230° C.
Injection time at 3 seconds,
Holding time at 10 seconds,
Cooling time at 20 seconds
Mold temperature at 60° C.

Injection molded test specimens were then impacted by the calibrated spherical dart mounted on the two columns crosshead having a known nominal energy and impact speed (minimum nominal energy of 15 J at test height). Dart drop weight was 5.0 kg whereas falling height was at 320 m (measured from the top specimen surface) and the resulting impacting speed was at 2.5 m/sec.

During test, Force Vs Time data were recorded and evaluated by means of a dedicated software, Force-Displacement and Force-Strain curves were consequently built-up so Impact break Energy as well as Brittle/Ductile Impact Behavior were then extrapolated. From Impact behavior the so called "Transition Temperature" can also be calculated, DBTT is the temperature at which 50% of specimen break in Ductile mode and 50% of specimen break in Brittle mode. Load cell having the following measurement range in compression: 4448 N (linearity: 0.1% FS; uncertainty: +/−1%) was used while the diameter of the hemispheric dart was 12.7 (±0.1 mm).

An ethanol cooling bath capable to reach and maintain the minimum temperature up to −50° C.±1° C. was used to carry out tests at low temperatures.

Gloss
According to ASTM D 2457
Materials Used in the Examples
Component A)

The propylene polymer composition A) HECO1 and HECO2 have components and features as reported in the following Table 1

| HECO 1 | Component a1 matrix | Component a2 rubber | Component A total Heco |
|---|---|---|---|
| Ethylene content % wt | 0 | 47.0 | 6.5 |
| Polydispersity index P.I. | 5.0 | — | — |
| Xylene Solubles. % wt | 3 | 87 | 15 |
| XSIV dl/g (η) | — | 2.6 | 2.4 |
| Split | 86 | 14 | |
| Flexural Modulus MPa | | | 1350 |
| MFR (g/10') | 30 | 0.50 | 17.0 |
| Ethylene content % wt | 0 | 49.5 | 19.5 |
| Polydispersity index P.I. | 6 | | |
| Xylene solubles X.S. % wt | 3 | 78 | 34 |
| XSIV dl/g (η) | — | 3.2 | 3.1 |
| Split | 60 | 40 | |
| Flexural Modulus MPa | | | 830 |
| MFR (g/10') | 100 | 0.15 | 8.0 |

Multimodal Ethylene Copolymer B)
Preparation of the Mixed Catalyst Systems:

Complexes 1 and 2 were Used for the Catalyst Preparation

Complex 1 is Bis(1-n-butyl-3-methyl-cyclopentadienyl) zirconium dichloride is commercially available from Albemarle Inc.

Complex 2 is 2,6-Bis[1-(2-Chlor-4,6-trimethylphenylimino)ethyl]pyridine iron(II) dichloride. It was prepared as in example 1 of WO 98/27124 and reacted in an analogous manner with iron(II) chloride to said complex 2.

Methylalumoxane (MAO) was received from Chemtura Inc. as a 30% (w/w) toluene solution.

Support:
XPO-2326A, a spray-dried silica gel from Grace
Support pretreatment XPO-2326 A was calcinated at 600° C. for 6 hours.

Preparation of the Catalyst System:
In a 3.09 L reactor A kg MAO (4.75 M in Toluol, 0.78 mol) were added. In a separated 0.5 L flask B gr complex 1 were mixed with C gr complex 2. The powder was transferred to the 3.09 L steel reactor and the flask flushed with 500 ml Toluene. The volume of the solution was 105% of that of the pores of the support.

The mixture was stirred cooled to −30° C. for one hour, then poured into the 10 L reactor very slowly, i.e. "dropwise". The mixture was stirred for 1 h. Then heptane was added to the catalyst volume of the solution was 250% of that of the pores of the support so that a slurry was obtained. The slurry of the catalyst was stirred for 30 min. The catalyst has been washed with filtered and dryed with nitrogen flow till obtaining a free flowing powder with an ivory colour.

The ratio of loadings of complex 1 and that of complex 2 is E μmol/g:μmol/g as reported below, whilst the molar ratio Al/(complex 1+complex 2) is derivable by calculation.

| Catalyst | A MAO Kg | B complex1 gr | C complex2 gr | E compl1:compl2 μmol/g:μmol/g |
|---|---|---|---|---|
| 1 | 5.8 | 25.4 | 114.5 | 8/53 |
| 2 | 5.8 | 46.6 | 114.5 | 17/53 |
| 3 | 5.8 | 19.8 | 114.5 | 7/53 |

Polymerisation Process:

Samples have been produced in Gas Phase fluidized bed continuous process. Process details are given in Table 1. The catalyst was metered into the reactor discontinuously by means of a pressurized gas mixture of propane 11% vol of the inert medium the rest being Nitrogen. The reactor pressure was controlled at 24 barg (bar gauge, i.e. relative pressure increase above atmospheric pressure). The average polyethylene output of the gas-phase fluidized bed reactor was 36 kg/h (Details in Table 2). The hold-up in the reactor was controlled, giving a residence time of 3 hours in the reactor. Gas velocity was 0.35 m/s. As an antistatic, 12 ppm (based on PE) Costelan AS100 were fed, though antistatics surprisingly proved not to be a mandatory element for the plastomer application, in contrast to higher density product. High mileage was achieved, no sheeting was observed during reactor operation. The discharged polymer was dried in a continuous way by flushing it with nitrogen.

The polymerization conditions used for each VLLDPE examples are given in the following Table 2:

| | PRODUCT TYPE | |
|---|---|---|
| | VLLDPE C2C6 | VLLDPE C2C4 |
| | Sample | |
| | VLLDPE1 | VLLDPE2 |
| Catalyst | 3 | 1 |
| Mileage [g/g] | 4375 | 4510 |
| Temperature [° C.] | 70 | 70 |
| Ethylene [Vol %] | 31.3 | 33.6 |
| Hexene/Ethylene or butene/Ethylene ratio [Vol %] | 0.046 | 0.19 |
| Total Inert [Vol %]: | 67.3 | 60.0 |
| (propane/nitrogen % vol/% vol) | (11/56) | (11/49) |
| Ethylene [kg/h] | (30) | (30) |
| Hexene or Butene/Ethylene [kg/C2 kg] | 0.25 | 0.21 |
| Hydrogen [ppm] | 2.1 | 22 |

Product details are reported in the following Table 3

| | Sample | |
|---|---|---|
| | VLLDPE1 Comparative C2C6 | VLLDPE2 C2C4 |
| IV [dL/g] (decalin) | 1.74 | 1.66 |
| XS | 45.4 | 54.2 |
| GPC Mw [g/mol] | 100984 | 99858 |
| GPC Mw/Mn | 7.96 | 6.05 |
| HDPE[%] from TREF | 22 | 19 |
| C6 (or C4) NMR [%] | 15.5 | 14.6 |
| Density Mc part [g/cm$^3$] | 0.886 | 0.889 |
| C6 (or C4) Mc [%]/IV Mc [dl/g] | 20/1.9 | 18/1.8 |
| DSC ΔH2 [J/g]* | 100.6 | 92.6 |
| Density total polymer [g/cm$^3$] | 0.903 | 0.9029 |

-continued

| | Sample | |
|---|---|---|
| | VLLDPE1 Comparative C2C6 | VLLDPE2 C2C4 |
| MFR 190° C., 2.16 kg [g/10'] | 1.84 | 1.81 |
| FRR | 22.8 | 20.33 |

*total ΔH in DSC second run

Preparation of the Polypropylene Compositions

The polymer composition A), the multimodal ethylene copolymer B) a commercial Talc component C) and a conventional pre-mix of additives and pigments (substantially consisting of antioxidants stabilizers and pigments, the carrier polymer has been considered contributing to the crystalline component a1) were blended and subjected to extrusion/granulation in a twin screw extruder (L/D=35) in amounts as reported in Table 4. Comparative and Reference compositions comprising a commercial HDPE (MFR 7.5 g/10 min at 190/2.16 ISO1133; Density 0.960 g/cm$^3$ ISO 1183/1) and a commercial impact modifier Engage 8150 (metallocene ethylene-octene copolymer with 25 wt % octene-1, MFR 1.4 g/10 min at 230/2.16 ISO1133; density 0.868 g/cm$^3$) are also reported. A commercial impact modifier heterophasic polymer composition HECO3 (Flexural modulus 200 MPa ISO178, MFR 2.5 g/10 min 230/2.16 ISO1133; IV.sol. 2.7 dl/g) is also used as component D) in example 2. HECO3 is comprising (percent by weight) 30% of an homopolymer matrix, 30% of a propylene-ethylene copolymer having a content of copolymerized ethylene of 34.0% wt, 40% of a propylene-ethylene copolymer having 70.0% wt of copolymerized ethylene. The resulting polymer compositions, particularly suitable for car interiors, have been analyzed.

The results are reported in the following Table 4.

| | | | Comp Ex 1 | Ex 1 | Ex. 2 |
|---|---|---|---|---|---|
| PP HECO component A | HECO1 | | 62.0 | 63.0 | 60.00 |
| VLLDPE component B | VLLDPE2 - C2C4 | | | 15.00 | 11.00 |
| Impact modifier component D | HECO 3 | | | | 7 |
| HDPE | HDPE HC GC7260 | | 6.00 | | |
| Impact modifier commercial | Engage 8150 - C2C8 | | 10.00 | | |
| Talc component C | Talc HTP Ultra 5C | | 19.50 | 19.5 | 19.5 |
| additives and pigments | | | 2.5 | 2.5 | 2.5 |
| Total Main Material | | | 100% | 100% | 100% |
| Physical - Mechanical characterization Analysis | Method | Unit | Comp Ex 1 | Ex 1 | Ex. 2 |
| MFR 230° C.-2.16 KG- | ISO 1133 | gr/10' | 15.4 | 15.9 | 14.9 |
| Flexural Modulus @ 23° C. | ISO 178 | MPa | 1975 | 2075 | 2003 |
| Gloss on plaque (60°) | ASTMD2475 | %. | 52.3 | 45.0 | 45.0 |
| IZOD Impact Strength @ 23° C. | ISO 180/1A | KJ/m$^2$ | 30.1 | 27.4 | 38.3 |
| IZOD Impact Strength @ −20° C. | ISO 180/1A | KJ/m$^2$ | 5.2 | 3.9 | 4.5 |
| IZOD Impact Strength @ −30° C. | ISO 180/1A | KJ/m$^2$ | 4.6 | 3.4 | 4.0 |
| Bi-axial Impact Energy @ −20° C. | | J | 6.2 | 11.0 | 10.0 |
| Bi-axial Impact Energy @ −30° C. | | J | 3.7 | 9.9 | 8.2 |

It is evident that at comparable or even higher (improved) stiffness lower gloss and maintained or higher impact (at least biaxial) is observed particularly at low temperature.

Further recipes were tested for bumpers. It is exhibited an improved impact at least advantageously at very low temperature (−30° C.) for VLLDPE2 (C2C4) as component (B) according to the invention, here compared with VLLDPE1 (C2C6) differing in the type of comonomer.

| Low fogging bumper grade | | Comp Ex 3 | Ex 3 |
|---|---|---|---|
| PP HECO component A | HECO3 | 60 | 60 |
| VLLDPE component B | VLLDPE1 - C2C6 | 16.5 | |
| | VLLDPE2 - C2C4 | | 16.5 |

-continued

| Low fogging bumper grade | | | Comp Ex 3 | Ex 3 |
|---|---|---|---|---|
| Talc component C | Luzenac Jetfine 3CA –5μ | | 21.5 | 21.5 |
| Pigments + Additives | | | 2 | 2 |
| Total Main Material | | | 100 | 100 |
| Properties | Norm | Unit | | |
| MFR 230/2.16 | ISO 1133 | g/10 min | 5.02 | 5.05 |
| Density | ISO 1183/1 | g/cm$^3$ | 1.053 | 1.0491 |
| Ash 1 h, 625° C. | ISO 3451/1 | % | 21.91 | 21.38 |
| Flexural Modulus | ISO 178 | N/mm$^2$ | 1200 | 1177 |
| Charpy notched impact strength 23° C. | ISO 179/1eA | kJ/m$^2$ | 81.23 | 78.38 |
| Charpy notched impact strength 0° C. | ISO 179/1eA | kJ/m$^2$ | 80.78 | 77.23 |
| Charpy notched impact strength –30° C. | ISO 179/1eA | kJ/m$^2$ | 12.43 | 21.429 |

What is claimed is:

1. A polyolefin composition comprising:
   A) 30% to 90% by weight of a propylene polymer composition comprising:
      a1) 20% to 90% by weight of a propylene homopolymer or of a copolymer of propylene or blends thereof, containing 3% by weight or less of copolymerized ethylene or $C_4$-$C_{10}$ α-olefin(s) or blends thereof, said homopolymer or copolymer or blends having an isotactic index higher than 96%,
      a2) 10% to 80% by weight of a copolymer of ethylene containing 40% to 70% by weight of copolymerized propylene or $C_4$-$C_{10}$ α-olefin(s) or of combinations thereof;
      said composition A having intrinsic viscosity of the xylene soluble fraction at room temperature of from 1.5 to 8 dl/g according to ASTM D 2857;
   B) 10% to 70% by weight of a multimodal ethylene copolymer with butene-1 as comonomer comprising:
      i) a density in the range from 0.850-0.935 g/cm$^3$ as measured according to ISO1183-1::2004;
      ii) a total butene-1 comonomer content ranging from 6-30% by weight;
      iii) a Mw/Mn value from 4 to 20 as measured by gel phase chromatography;
      iv) an intrinsic viscosity, as determined in decalin at 135° C. according to EN ISO 1628-312003, between 1 and 4 dl/g,
   further comprising an HDPE fraction determined via TREF analysis of up to 30% by weight;
   C) up to 50% by weight of a filler.

2. The polyolefin composition according to claim 1, further comprising:
   D) up to 10% by weight, with respect to the overall composition, of an impact modifier masterbatch consisting of an heterophasic copolymer component comprising:
      a) 10-45% by weight of a homopolymer or a copolymer of propylene;
      b) 10-30% by weight of a copolymer of propylene with ethylene, containing from 18-45% of ethylene;
      c) 35-60% by weight of a copolymer of propylene with ethylene, containing from 55-85% by weight of ethylene;
   said component (D) having a MFR L measured at 230° C./2.16 kg according to ISO 1133:2005 of from 0.01 to 10 g/10 min., a value of the Intrinsic viscosity of the fraction soluble in xylene at room temperature (XSIV) of from 1.5 to 3 dl/g and a value of the ratio XSIV/MFR L equal to or lower than 6.

3. An injection molded article comprising the polyolefin composition of claim 1.

4. The injection molded article of claim 3, wherein the article is selected from a bumper, a bumper cover, an exterior fascia, an air dam, automotive trim, a dash board and an air bag cover.

* * * * *